United States Patent [19]

Sauvinet et al.

[11] Patent Number: 5,286,295
[45] Date of Patent: Feb. 15, 1994

[54] NOZZLE WITH NONSYMMETRICAL FEED FOR THE FORMATION OF A COATING LAYER ON A RIBBON OF GLASS, BY PYROLYSIS OF A GAS MIXTURE

[75] Inventors: M. Vincent Sauvinet, Saint-Denis; M. Jean-Francois Oudard, Thiescourt, both of France

[73] Assignee: Saint-Gobain Vitrage International, Courbevoie, France

[21] Appl. No.: 829,505

[22] Filed: Feb. 3, 1992

[30] Foreign Application Priority Data

Feb. 13, 1991 [FR] France ................. 91 01682

[51] Int. Cl.$^5$ .............................. B05C 1/04
[52] U.S. Cl. ............................ 118/718; 118/729; 65/60.1; 65/60.51; 427/255.5
[58] Field of Search ............ 118/718, 725, 729; 239/104, 124, 127; 65/60.1, 60.51; 427/255.5

[56] References Cited

U.S. PATENT DOCUMENTS

| | | | |
|---|---|---|---|
| 3,674,453 | 7/1972 | Loukes et al. | 65/30 |
| 3,850,679 | 11/1974 | Sopko et al. | 118/718 |
| 4,469,045 | 9/1984 | Chesworth | 118/718 |
| 4,793,282 | 12/1988 | Greenberg et al. | 118/719 |
| 4,933,211 | 6/1990 | Sauvinet et al. | |
| 5,022,905 | 6/1991 | Grundy et al. | 118/719 |
| 5,041,150 | 8/1991 | Grundy et al. | 118/718 |
| 5,065,696 | 11/1991 | Greenberg et al. | 118/729 |
| 5,122,394 | 6/1992 | Lindner | 427/255.5 |

FOREIGN PATENT DOCUMENTS 0365240  4/1990  European Pat. Off. ............ 118/718

OTHER PUBLICATIONS

Chemical Abstracts, vol. 98, No. 14, Apr. 1983, Columbus, Ohio,, U.S.; Abstract No. 112478S, Nippon Sheet Glass Co. Ltd. "Apparatus for making metal oxide-coated ribbon—like glass" p. 307; col. 1.

Primary Examiner—Anthony McFarlane
Attorney, Agent, or Firm—Oblon, Spivak, McClelland, Maier & Neustadt

[57] ABSTRACT

A nozzle for depositing of thin layers on glass by the process of pyrolysis from gas, known as CVD, can be installed above a moving ribbon of glass (10) having zones (40, 42) of unequal length in which the depositing can occur and placed upstream and downstream from gas supply (38). The nozzle allows the depositing of coating layers that are thick and/or that require large amounts of gas.

14 Claims, 1 Drawing Sheet

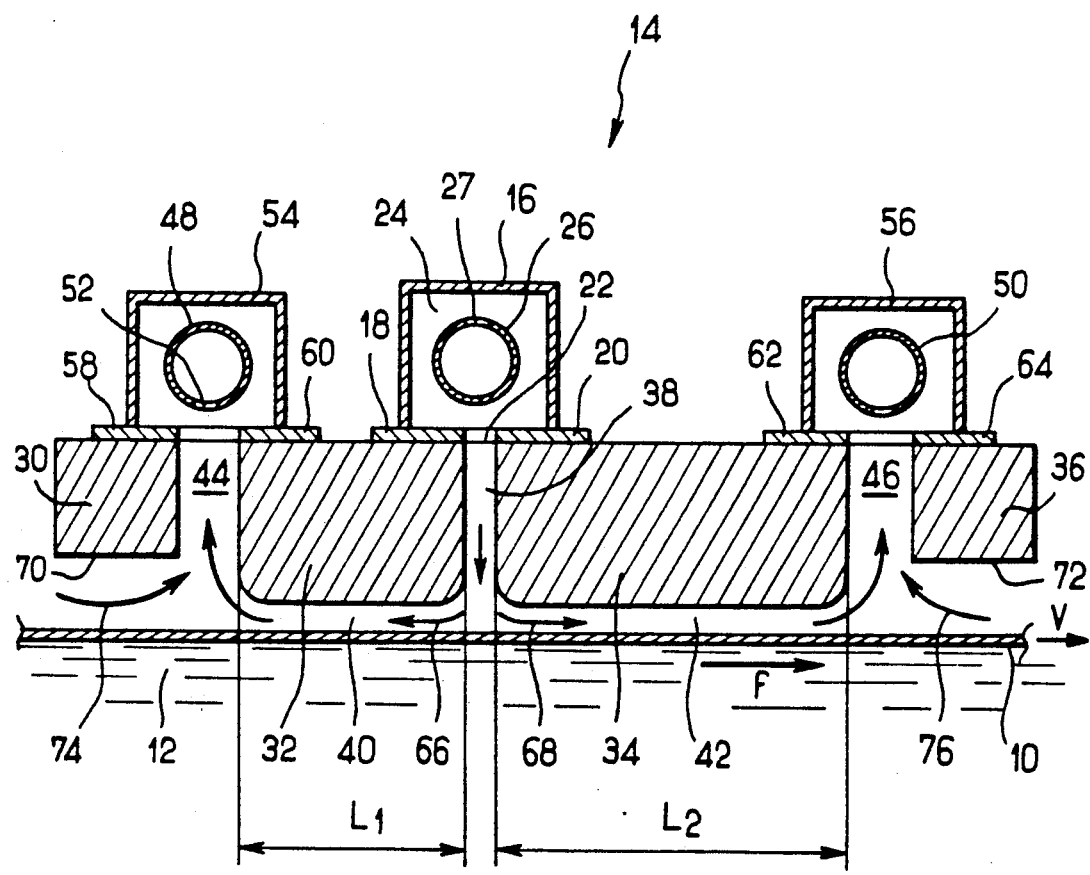

NOZZLE WITH NONSYMMETRICAL FEED FOR THE FORMATION OF A COATING LAYER ON A RIBBON OF GLASS, BY PYROLYSIS OF A GAS MIXTURE

BACKGROUND OF THE INVENTION

1. Field of the Invention

This invention relates to a nozzle in an apparatus for the formation, on a ribbon of hot glass, of a coating layer obtained from gas, such as gases of metal carbonyls or of volatile hydrogenated metal compounds that can decompose on touching the hot glass, for example silanes and, particularly, monosilane.

2. Description of the Related Art

From patent FR 2 314 152, a nozzle of this type is known through which a coating gas is sent over the face to be coated of the ribbon of glass being displaced, the coating gas emitted by a distributor which extends crosswise to the ribbon and to the direction of movement of the latter, so that the gas flows out parallel to the surface of the glass, under laminar flow conditions and with a uniform flow rate over the entire width of the ribbon.

For this purpose, the nozzle comprises a gas injection device, a central shaped block, an upstream lateral shaped projection and a downstream lateral shaped projection placed on both sides of the central block so as to offer to the gas arriving from the injection device a flow path along a U-shaped guide channel which extends between the upstream lateral projection and the central block, between the lower face of the central block and the ribbon of glass, and between the central block and the downstream projection and a gas suction device provided at the outlet of the channel between the central block and the downstream projection.

The terms upstream, central and downstream refer to the direction of movement of the ribbon of glass.

The upstream projection and the downstream projection are provided with flat lower faces which extend parallel to the surface of the glass and at a slight distance from this surface (about 1 mm), to minimize the escape of gas between these faces and the glass.

This nozzle operates well when it is desired to deposit on the ribbon of glass a coating of small thickness, for example less than 60 nanometers and/or involving low flow rates of gas, for example on the order of 100 l/min on a nozzle about 3.30 m wide. Actually, for these thicknesses, the gas current that is in the horizontal part of the channel flows out at a speed less than that of the ribbon. This current is, thereby, entirely entrained downstream by the ribbon of glass, so that no escape of gas or clogging on the upstream projection occurs. Also, the escape that can occur under the downstream projection is sufficiently small so that the production periods are long in comparison with the cleaning periods. The waste of glass during cleaning periods is therefore relatively limited.

On the other hand, when it is desired to deposit on the glass a thicker coating layer, for example on the order of 80 nanometers, and/or involving greater gas flow rates, for example on the order of at least 400 l/min on a nozzle about 3.30 m wide, the speed of passage of the gas can clearly be greater than that of the ribbon of glass. But this increase of speed creates the following drawbacks:

The length of the horizontal part of the channel of U-shaped section must be elongated in the same proportion as the speeds, so that the contact time of the gas with the glass is sufficient to both assure its decomposition and to obtain the desired layer thickness.

Since the speed of the gas is greater than the ribbon of glass, the escape of gas under the downstream projection becomes considerable and gas also begins to escape under the upstream projection. The lower faces of these projections quickly clog with deposits of coating material, which creates gas streams where the flow speeds are higher, and is reflected by a nonhomogeneous deposit in the crosswise direction of the ribbon of glass. The latter is then covered with a layer of material whose thickness (and therefore color), luminous reflectance and light transmittance vary crosswise, When the clogging becomes too great, particles of coating can touch the glass and leave marks.

The deposits which grow over time require a periodic cleaning of the nozzle, thereby causing a waste of glass since the glass production installation continues to deliver during the cleaning.

The nonrecovered escaped gas pollutes the atmosphere of the float bath of the glass when such a nozzle is installed on the inside of a float chamber for the production of the glass.

SUMMARY OF THE INVENTION

This invention has as an object to eliminate all of the above drawbacks by providing a nozzle that can deposit on the ribbon of glass a layer that is relatively thick and/or that permits high flow rates of gas.

The nozzle according to the invention comprises a first and a second central shaped block that define between them a central injection passage extending crosswise in relation to the ribbon of glass, said central blocks forming with the ribbon of glass two passages of constant thickness between which the gas which arrives from the central injection passage is divided into two laminar currents, parallel to the ribbon of glass and that ar directed one upstream and the other downstream. An upstream shaped projection and a downstream shaped projection are mounted respectively upstream from the first central block and downstream from the second central block, and define with these latter an upstream suction passage and a downstream suction passage, at least one of said upstream and downstream projections being, preferably, provided with a lower face that is raised in relation to the ribbon of glass.

The nozzle further comprises a gas injection device mounted at the intake of the central injection passage and two gas suction devices mounted respectively at the outlet of said upstream and downstream suction passages.

When the upstream and downstream projections are raised in relation to the ribbon of glass, the possible clogging of their lower faces is not disturbing to the gas flow. In particular, it causes neither such modification of gas flows that could lead to irregularities of the coating, nor the formation of marks which could be made on the glass when the gas flow modifications become too great.

Moreover, although said upstream and downstream projections are at a great distance from the ribbon of glass, no escape of gas upstream and downstream occurs because the two gas currents which flow out over the ribbon of glass upstream and downstream are respectively blocked by countercurrents of ambient gas which are drawn in at the same time as said gas currents.

Since the ribbon of glass is moving, it has a tendency to entrain downstream a large fraction of the gas flow arriving from the central injection passage. This flow fraction flows out at a speed greater than that of the remaining flow which is directed upstream. Consequently, if the central injection passage is placed at an equal distance from the upstream and downstream suction passages, the corresponding time for the routing of the gas upstream along the imposed path would be longer than that necessary for the pyrolysis on the hot ribbon of glass, which means that a part of the length of the first central block would be useless. On the other hand, the contact time for the gas current directed downstream would not be sufficient, so that a part of the coating gas would not be used. Such a central feeding nozzle is therefore not optimum from the viewpoint of the consumption of deposit reactant gas and of bulk. This latter point is particularly critical when the coating installation is placed in the chamber of a float bath where the available space is reduced.

These drawbacks are eliminated according to the invention by the fact that the lengths of the central blocks are unequal. They are calculated in such a way that the contact times of the gas with the ribbon of glass are approximately equal for the gas current that is directed upstream and the gas current that is directed downstream.

Such a nozzle with optimized proportions is relatively compact and it can be introduced into a float chamber. It has deposit capacities such that it allows deposits which were considered unacceptable with standard nozzles.

BRIEF DESCRIPTION OF THE DRAWINGS

An embodiment of the invention will now be described, in detail, with regard to the single accompanying FIGURE which diagrammatically represents the nozzle in cross section.

DETAILED DESCRIPTION OF THE PREFERRED EMBODIMENT

The FIGURE shows a ribbon of glass 10 floating on the surface of a metal bath 12, for example molten tin inside a chamber containing the tin bath. The glass is poured over the bath from a glass melting furnace, not shown, located to the left of the figure. It spreads out to form a ribbon which is removed from the bath at a constant speed in the direction of arrow f by extracting means mounted at the output of the bath.

Above ribbon of glass 10, in a zone of the float bath where the glass has acquired dimensional stability, a nozzle 14 is mounted for the delivery of coating gas. The nozzle is placed crosswise to the ribbon of glass and it extends over the entire width of the latter (i.e., transverse to the direction of arrow f). It includes a section 16 of upside down U-shape whose vertical wall edges are fastened to horizontal brackets 18, 20. These define between them an oblong opening 22 that extends crosswise in relation to the ribbon and has a length equal to the width of the ribbon.

In chamber 24, defined by the section 16, is housed a gas supply duct 26 that is pierced over its entire length with holes 27. A gas from duct 26 thus flows into chamber 24 where it reaches a uniform pressure and flows out through opening 22.

The nozzle has an upstream shaped projection 30, a first central shaped block 32, a second central shaped block 34 and a downstream shaped projection 36, placed in this order from upstream to downstream, above ribbon of glass 10.

These elements, which are all ordinarily made of carbon, each extend over the entire width of the ribbon of glass and define a vertical injection passage 38 between the contiguous lateral walls of the two central blocks 32 and 34 and communicating with opening 22. A horizontal upstream passage 40 and a horizontal downstream passage 42, of constant thickness (about 3 to 6 mm), are defined respectively between the lower walls of the central blocks and the ribbon of glass. An upstream suction passage 44 is formed between upstream projection 30 and first central block 32 and a downstream suction passage 46 is formed between second central block 34 and downstream projection 36.

On the outlet of suction passages 44 and 46 are fitted suction means, consisting in a way known in the art of ducts 48, 50 pierced with holes 52 and extending over the entire width of the installation. These ducts are housed in upside down U-shaped sections 54, 56, fastened to the central blocks and to the projections by brackets 58, 60 and 62, 64.

The gas current arriving from feed duct 26 descends through injection passage 38 and is then divided into two parts: an upstream current 66 flowing out into upstream horizontal passage 40 in the opposite direction of that of the movement of the ribbon of glass, and a downstream current 68 which flows out into downstream passage 42 in the same direction as that of the movement of the ribbon of glass. Finally, the upstream current and the downstream current are drawn in through upstream and downstream suction passages 44 and 46.

According to the invention, to prevent the possible clogging of upstream and downstream projections 30 and 36 from disturbing the gas flow, lower faces 70, 72 of the latter are raised above the ribbon of glass 10 by a distance higher than that of the central blocks, for example by a distance of between 3 and 50 mm and, preferably, between 10 and 30 mm and even between 10 and 20 mm. This distance does not cause the escape of coating gas under the projections because the partial vacuum which is created by the suction in suction passages 44, 46 creates countercurrents of ambient gas 74, 76 under these projections and flowing in the opposite direction to the upstream and downstream currents 66 and 68, and thus blocking any escape.

In order to optimize the resultant cost of the consumption of gas reactants and the bulk of the nozzle, central blocks 32, 34 are dimensioned so that the contact time of coating gas with the ribbon of glass 10 is equal for upstream current 66 and for downstream current 68. We will designate by:

$L_1$ the length of central block 32,
$L_2$ the length of central block 34,
$V_1$ the flowing speed of the gas in upstream passage 40,
$V_2$ the flowing speed of the gas in downstream passage 42,
K a constant
v the speed of advance of the ribbon of glass,
$\Delta P_1$ the upstream pressure drop, and
$\Delta P_2$ the downstream pressure drop.
$\Delta P_1 = K \cdot L_1 (V_1 + v/2)$
$\Delta P_2 = K \cdot L_2 (V_2 - v/2)$ The equality of the contact times of the gas with the ribbon of glass upstream and downstream is expressed by the equation:

$$L_1/V_1 = L_2/V_2 \quad (1)$$

The equality in fact of the upstream and downstream pressure drops is written:

$$L_1(V_1 + v/2) = L_2(V_2 - v/2) \quad (2)$$

It is assumed:

$$V_1 + V_2 = V \quad (3)$$

where V is the injection speed of the gas in passage 38.

It is known that $V = Q/e$, where Q is the flow rate per meter of width of the nozzle and e is the thickness of the gas space between the central blocks and the ribbon of glass.

Considering (1), equation (2) becomes:

$$V_1(V_1 + v/2) = V_2(V_2 - v/2)$$

and by replacing V2 in this equation with its value $V - V_1$ derived from (3), $$V_1 = (V - v/2)/2 \quad (4)$$

$$V_2 = (V + v/2)/2 \quad (5)$$

hence it is derived:

$$L_1/L_2 = (V - v/2)/(V + v/2) \quad (6)$$

Now a numeric application will be given: namely $v = 0.2$ m/sec
$V = 0.4$ m/sec $$L_1 + L_2 = 400 \text{ mm} \quad (7)$$

There is obtained:

$$V_1 = 0.15 \text{m/sec}$$

$$V_2 = 0.25 \text{ m/sec}$$

The solution of the system of equations (6), (7) gives:

$$L_1 = 150 \text{ mm}$$

$$L_2 = 250 \text{ mm}$$

Such a nozzle with optimized proportions has a high yield and it allows deposits considered unacceptable with standard nozzles.

Such a nozzle can be mounted inside a float chamber as described, but it can also be mounted outside of the float chamber.

Further, additional suction means can be positioned upstream and/or downstream from this nozzle, in particular if one of the projections is not raised, for example the upstream projection, on the same side as the projection that is not raised.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United Stages is:

1. Nozzle for the formation of a coating layer on a ribbon of glass moving at a constant speed over a float bath by pyrolysis of a laminar flow gas mixture, comprising:

first and second central shaped blocks that define therebetween a central injection passage extending crosswise to a direction of movement of the ribbon of glass and connected to a source of gas, said central blocks forming with the ribbon of glass two passages of constant thickness communicating with said central injection passage, wherein a gas from the central injection passage is divided into said two passages so as to form two laminar currents flowing parallel to the ribbon of glass, one of said currents flowing upstream and the other downstream, relative to the direction of movement;

an upstream shaped projection and a downstream shaped projection mounted respectively upstream from the first central block and downstream from the second central block, relative to the direction of movement, the central blocks and shaped projections defining an upstream suction passage and a downstream suction passage, wherein at least one of said upstream and downstream projections has a lower face that is raised from the ribbon of glass relative to said passages of constant thickness and is spaced from the ribbon of glass by between 3 mm and 50 mm; and gas suction means for creating suction in at least one of the upstream and downstream passages corresponding to the at least one of the upstream and downstream projections having a raised lower face.

2. Nozzle according to claim 1, wherein the lower faces of the shaped projections are vertically spaced from the ribbon of glass by between 10 and 30 mm.

3. Nozzle according to claim 1, wherein the lower faces of the shaped projections are vertically spaced from the ribbon of glass by between 10 and 20 mm.

4. Nozzle according to claim 1, wherein said central blocks are configured such that the lengths of the two passages of constant thickness are different from one another.

5. Nozzle according to claim 4, wherein lengths of said central elements in the direction of movement are such that the contact time of the gas with the ribbon or glass is approximately equal for the laminar gas current flowing upstream and for the laminar gas current flowing downstream.

6. Nozzle according to claim 4, wherein lengths of said central elements are approximately such that:

$$L_1/L_2 = (V - v/2)/(V + v/2)$$

where V is the injection speed of the coating gas in the central injection passage, v the speed of movement of the ribbon of glass, $L_1$ is a length of an upstream one of said central blocks and $L_2$ is a length of a downstream one of said central blocks.

7. Nozzle according to claim 5, wherein lengths of said central elements are approximately such that:

$$L_1/L_2 = (V - v/2)/(V + v/2)$$

where V is the injection speed of the coating gas in the central injection passage, v the speed of movement of the ribbon of glass, $L_1$ is a length of an upstream one of said central blocks and $L_2$ is a length of a downstream one of said central blocks.

8. Nozzle according to claim 1 including two gas suction devices mounted respectively at the outlets of said upstream and downstream suction passages.

9. Nozzle according to claim 1, mounted inside a float chamber.

10. Nozzle for the formation of a coating layer on a ribbon of glass moving at constant speed on a float bath by pyrolysis of a laminar flow gas mixture, comprising:

first and second central shaped blocks defining therebetween a central injection passage extending crosswise to a direction of movement of the ribbon of glass and connected to a source of gas, said central blocks forming with the ribbon of glass two passages communicating with said central injection passage and between which a gas from the central injection passage is divided so as to form two laminar currents flowing parallel to the ribbon of glass, one of said currents flowing upstream and the other downstream relative to the direction of movement, wherein said central blocks are configured such that the lengths of said two passages in a direction of movement of the ribbon of glass are different from one another, and wherein lengths of said central elements in the direction of movement are such that the contact time of the gas with the ribbon of glass is approximately equal for the laminar gas current flowing upstream and for the laminar gas current flowing downstream.

11. Nozzle according to claim 10, wherein lengths of said central elements are approximately such that:

$$L_1/L_2 = (V - v/2)/(V + v/2)$$

where V is the injection speed of the coating gas in the central injection passage, v the speed of movement of the ribbon of glass, $L_1$ is a length of an upstream one of said central blocks and $L_2$ is a length of a downstream one of said central blocks.

12. Nozzle according to claim 10 including two gas suction devices mounted respectively at the outlets of said upstream and downstream suction passages.

13. Nozzle according to claim 10, mounted inside a float chamber.

14. Nozzle for the formation of a coating layer on a ribbon of glass moving at a constant speed over a float bath by pyrolysis of a laminar flow gas mixture, comprising:

first and second central shaped blocks that define therebetween a central injection passage extending crosswise to a direction of movement of the ribbon of glass and connected to a source of gas, said central blocks forming with the ribbon of glass two passages of constant thickness communicating with said central injection passage, wherein a gas from the central injection passage is divided into said two passages so as to form two laminar currents flowing parallel to the ribbon of glass, one of said currents flowing upstream and the other downstream, relative to the direction of movement;

an upstream shaped projection and a downstream shaped projection mounted respectively upstream from the first central block and downstream from the second central block, relative to the direction of movement, the central blocks and shaped projections defining an upstream suction passage and a downstream suction passage, wherein at least one of said upstream and downstream projections has a lower face that is raised from the ribbon of glass relative to said passages of constant thickness, wherein said central elements are configured such that the lengths of the two passages of constant thickness are different from one another, wherein lengths of said central elements in the direction of movement are such that the contact time of the gas with the ribbon or glass is approximately equal for the laminar gas current flowing upstream and for the laminar gas current flowing downstream.

* * * * *